(12) United States Patent
Zekri et al.

(10) Patent No.: US 7,857,443 B2
(45) Date of Patent: Dec. 28, 2010

(54) ASSEMBLY FORMING A PAIR OF SPECTACLES ESPECIALLY FOR AN INFANT OR VERY YOUNG CHILD

(76) Inventors: Ahmed Zekri, 38 rue Saint-Exupéry, F-01100 Oyonnax (FR); Olivier Maitre, 119 chernin du Maquis, F-01580 Matafelon Grange (FR)

( * ) Notice: Subject to any disclaimer, the term of this patent is extended or adjusted under 35 U.S.C. 154(b) by 0 days.

(21) Appl. No.: 12/530,750

(22) PCT Filed: Mar. 25, 2008

(86) PCT No.: PCT/EP2008/053498

§ 371 (c)(1),
(2), (4) Date: Sep. 10, 2009

(87) PCT Pub. No.: WO2008/125432

PCT Pub. Date: Oct. 23, 2008

(65) Prior Publication Data

US 2010/0091239 A1    Apr. 15, 2010

(30) Foreign Application Priority Data

Mar. 26, 2007    (FR) .................................. 07 02175

(51) Int. Cl.
*G02C 5/00*    (2006.01)
*G02C 1/00*    (2006.01)

(52) U.S. Cl. ............................. 351/41; 351/83; 351/158
(58) Field of Classification Search .................... 351/41, 351/83–87, 111, 158
See application file for complete search history.

(56) References Cited

U.S. PATENT DOCUMENTS

| 4,944,039 A | 7/1990 | Dietrich |
| 4,955,394 A | 9/1990 | Dean |
| 5,853,005 A | 12/1998 | Scanlon |
| 2009/0013449 A1 * | 1/2009 | Kahn .......................... 2/209.13 |
| 2009/0257020 A1 * | 10/2009 | Paolino ....................... 351/158 |

FOREIGN PATENT DOCUMENTS

| EP | 0285684 | 10/1988 |
| FR | 1426581 | 4/1966 |

* cited by examiner

*Primary Examiner*—Huy K Mai
(74) *Attorney, Agent, or Firm*—Defillo & Associates, Inc; Evelyn A. Defillo

(57) ABSTRACT

The present invention relates to an assembly forming a pair of spectacles especially for an infant or very young child having a connection piece, which is joined, or can be joined, to a pair of spectacles. In addition, the assembly is joined, or can be joined, to a pacifier.

13 Claims, 3 Drawing Sheets

ASSEMBLY FORMING A PAIR OF SPECTACLES ESPECIALLY FOR AN INFANT OR VERY YOUNG CHILD

This application is a national stage entry of PCT/EP2008/053498 filed Mar. 25, 2008, under the International Convention claiming priority over France application No. 0702175 filed Mar. 26, 2007.

FIELD OF THE INVENTION

The present invention concerns an assembly forming a pair of spectacles, in particular for an infant or very young child.

BACKGROUND OF THE INVENTION

It is sometimes very difficult to make an infant or very young child wear spectacles, in particular sunglasses, eyeglasses or comfort glasses. However, wearing sunglasses can be necessary, even obligatory, in case of strong sunshine or the need for vision correction.

Pairs of spectacles for infants comprising traditional branches exist. These spectacles do not hold their position on the infant's head particularly well and, not always being well accepted by the infant, can be easily removed by the latter.

Pairs of spectacles also exist whereof the arms are replaced by an elastic band. These spectacles have substantially the same drawbacks as those mentioned above.

To date, no pair of spectacles exists whereof wearing is easily accepted by an infant or very young child. It is the aim of the present invention to resolve this drawback.

SUMMARY OF THE INVENTION

The assembly according to the present invention comprises a connection piece which is joined, or can be joined, to a pair of spectacles, and which is joined, or can be joined, to a pacifier; said connection piece is dimensioned, and said pacifier is arranged, or can be arranged, on this connection piece, such that, when the connection piece is joined to a pair of spectacles and to a pacifier and the pacifier is placed in the mouth of a user, the pair of spectacles is situated in line with the eyes of this user.

Thus, when the pacifier is in the mouth of a user, in particular an infant, the spectacles are located in line with this user's eyes. This infant does not have the sensation of having spectacles on his head, which leads to much greater acceptance of wearing these spectacles, and even more so in that the child is calmed by the presence of the pacifier in his mouth.

The term "pacifier" must be understood in the broadest sense of the term, including any object of a nature to be sucked on by a user such as an infant or very young child. It may in particular involve suckers or other sweets in pacifier form.

Said connection piece can be integral with the pair of spectacles, constituting an extension thereof, or can comprise means for assembly to an existing pair of spectacles.

In the same way, the pacifier can be integral with said connection piece, or the connection piece can comprise means for assembly to an existing pacifier.

Preferably, said connection piece comprises two connection arms extending from the lower zone of each spectacle, leaving a free zone for passage of the infant or very young child's nose and coming together at a zone designed to be situated in line with the mouth of this infant or very young child.

Said connection piece thus configured may have extended resting against the face of an infant or very young child, and may therefore have reinforced stability in relation to this face.

The connection piece can have a slightly curved shape, adapted to the curvature of an infant or very young child's face. It thus forms a sort of "mask" for the lower part of the infant's face, which increases the stability of its resting in relation to this face.

Said means for assembly of the connection piece to a pacifier including a pacifier body can in particular comprise a hole arranged through said connection piece, configured in order to allow this connection piece to be engaged tightly on the body of the pacifier.

The assembly of the connection piece on the pacifier is thus realized solely by friction.

Said hole can comprise two notches arranged on two sides opposite this hole, allowing engagement of said connection piece on a ring generally comprised by a pacifier body.

According to another possibility, the assembly means can comprise snap-in tabs receiving the pacifier body between them.

According to still another possibility, the assembly means comprise one or several adaptation pieces comprising, on one hand, means for removable assembly to said connection piece, and on the other hand assembly means adapted to a determined type of pacifier body.

A same connection piece can thus be adapted to different types of pacifier body, through the use of one or several adaptation pieces corresponding to these pacifier bodies.

The pair of spectacles can be provided without arms or can comprise arms. These arms make it possible to increase the stability of this pair of spectacles with regard to the child's face.

The invention will be well understood, and other characteristics and advantages thereof will appear, in reference to the appended diagrammatic drawing, illustrating, as non-limiting examples, one preferred embodiment of the assembly it concerns.

DETAILED DESCRIPTION OF THE INVENTION

Figure 1:
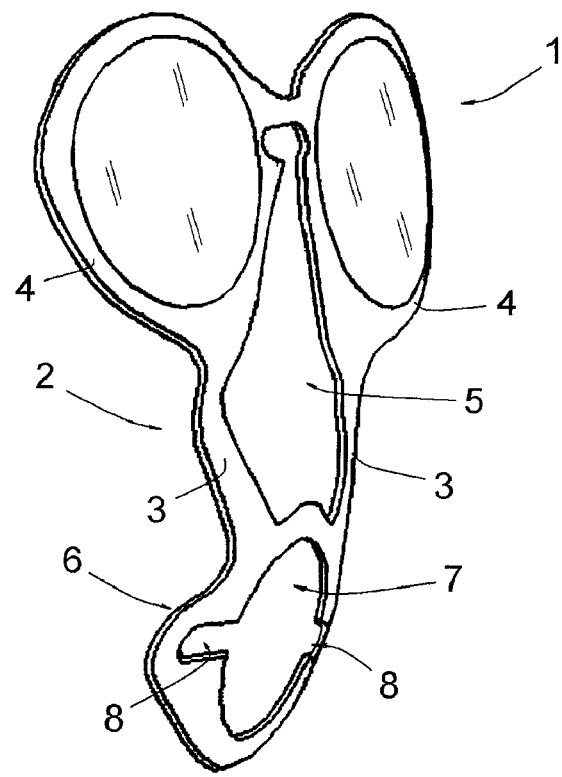
FIG. 1 is a perspective view of a pair of spectacles and a connection piece comprised by this assembly.
Figure 2:
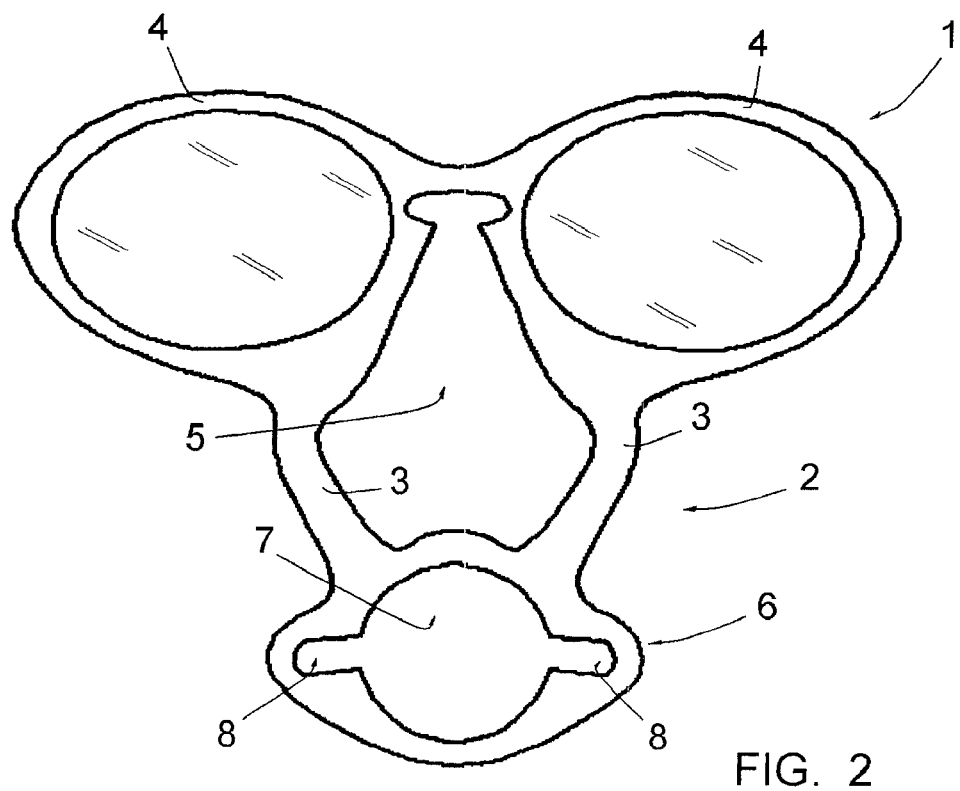
FIG. 2 is a front view of this pair of spectacles and this connection piece.
Figure 3:
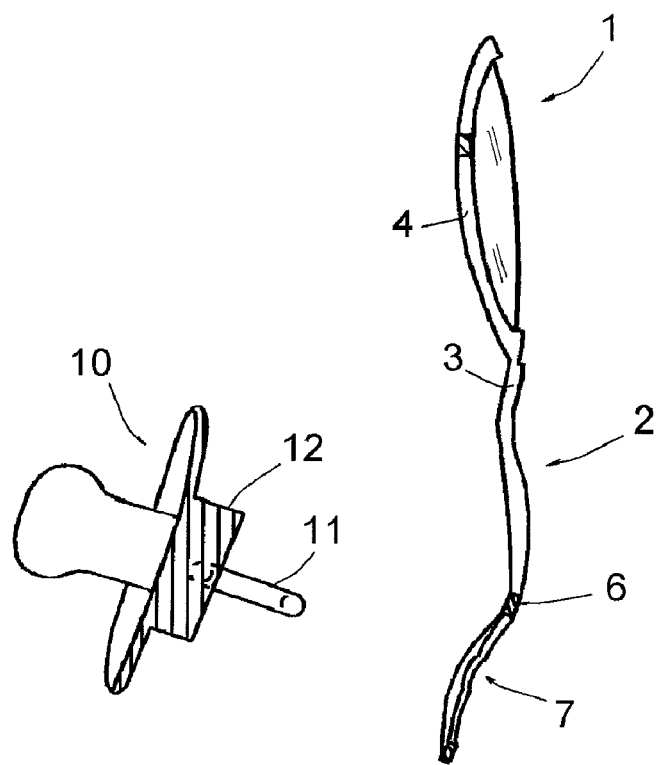
FIG. 3 is a side view, in longitudinal cross-section, of this pair of spectacles and this connection piece, before mounting of a pacifier on them.

FIGS. 1-3 show a pair of spectacles 1 for an infant or very young child, comprising a connection piece 2 oriented in a direction, which corresponds to the bottom of the spectacle-wearer's face.

This connection piece 2 is integral with the pair of spectacles 1, which can in particular be realized with it in a single connection piece made in molded synthetic material.

The connection piece 2 comprises two connection arms 3 extending from the lower zone of each spectacle 4, leaving a free zone 5 for passage of the infant or very young child's nose and coming together at a more or less oval zone 6. The connection piece 2 has a slightly curved shape, both longitudinally and transversely, adapted to the curvature of an infant or very young child's face.

The zone 6 comprises a hole 7 formed through it, and two notches 8 arranged on two opposite sides of this hole 7.

Figure 4:
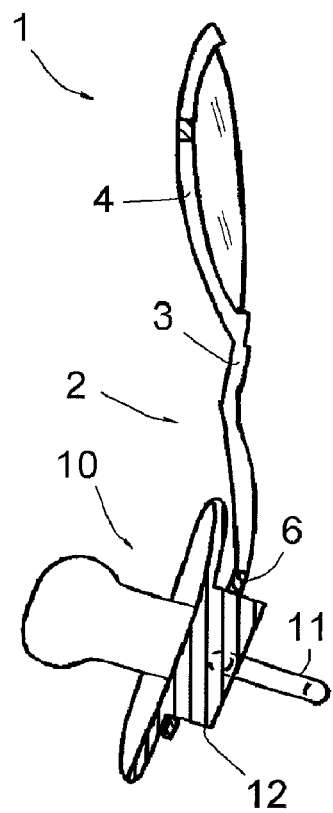
FIG. 4 is a view similar to FIG. 3, after mounting of the pacifier.

These notches 8 ate dimensioned in order to allow engagement through them of the ring 11 of a pacifier 10, and the hole 7 is dimensioned in order to allow the zone 6 to be engaged tightly on the body 12 of this pacifier, as is visible in FIG. 4.

As is understood, said connection piece 2 is dimensioned, and the hole 7 is arranged on this connection piece 2, such that, when the pacifier 10 is placed in the mouth of an infant or a very young child, the spectacles 4 are situated in line with the eyes of this infant or very young child.

The infant thus wears spectacles without having the sensation of having these spectacles on his head, which leads to much greater acceptance of wearing spectacles, and even more so in that the child is calmed by the presence of the pacifier in his mouth.

The connection piece 2 can have extended resting against the face of an infant or very young child and may therefore have reinforced stability in relation to this face.

The hole 7 allows the mounting of the connection piece 2 on the pacifier 10 only by friction, such that this mounting is easy to realize and the pacifier 10 can be easily separated from the connection piece 2 if necessary.

Figure 5:
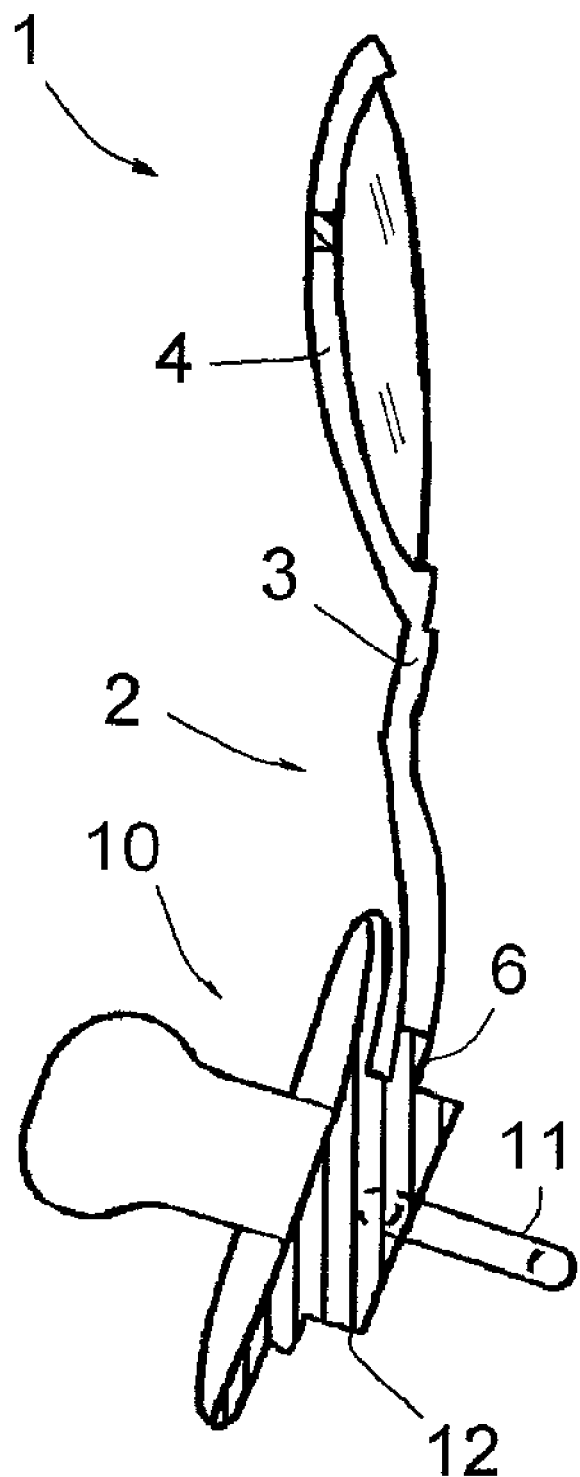
FIG. 5 is a view of one embodiment of the present invention showing the connection piece according to the present invention having the pacifier as an unitary piece with the connection piece.

FIG. 5 is a view of one embodiment of the present invention showing the connection piece according to the present invention having the pacifier as an unitary piece with the connection piece.

As appears from the preceding, the invention provides an assembly forming a pair of spectacles whereof wearing is easily accepted by an infant or very young child, which constitutes a determining advantage in relation to the similar pairs of spectacles of the prior art.

The invention was described above in reference to an embodiment provided purely as an example. It goes without saying that it is not limited to this embodiment, but that it extends to all embodiments covered by tie appended claims. Thus, the term "pacifier" must be understood in the broadest possible sense of the term, including any object of a nature to be sucked by an infant or very young child; it may in particular involve pacifiers or other sweets in pacifier or sucker form; the connection piece 2 may not be integral with the pair of spectacles 1 and comprise means for assembly to an existing pair of spectacles; the pacifier 10 can be integral with the connection piece 2; the pair of spectacles 1 can comprises arms.

The invention claimed is:

1. An assembly forming a pair of spectacles especially for an infant or very young child comprising:
   a connection piece shaped to fit the curvature of the infant or the very young child's face, wherein the connection piece extends from the top of the eyes to below the mouth of the infant of the very young child;
   wherein the connection piece comprises a pair of spectacles and is adapted to receive a pacifier;
   wherein the shape of the connection piece allows that when the pacifier is placed in the mouth of the infant or the young child, the pair of spectacles is situated in line with the eyes of the infant or the young child.

2. The assembly according to claim 1, wherein the connection piece is integral with the pair of spectacles and constituting an extension thereof.

3. The assembly according to claim 1, wherein the connection piece comprises means for attaching it to an existing pair of spectacles.

4. The assembly according to claim 1, wherein the pacifier is integral with the connection piece.

5. The assembly according to claim 1, wherein the pacifier does not form part of the connection piece and wherein the connection piece comprises attaching means for holding an existing pacifier.

6. The assembly according to claim 5, wherein the attachment means comprise snap-in tabs for holding the pacifier.

7. The assembly according to claim 5, wherein the attachment means comprises at least one adaptation piece, wherein adaptation piece comprises in one end means for removably attaching to the connection piece, and on the other end means adapted to a determined type of pacifier body.

8. The assembly according to claims 1, wherein the connection piece comprises two connection arms extending from the lower zone of each spectacle, creating an empty zone for the passage of the infant or the very young child's nose, wherein the connections arms get together at a zone designed to be situated in line with the mouth of the infant or the very young child.

9. The assembly according to any of claim 8, wherein the zone situated near the mouth of the infant or the very young comprises a hole configured to engaged with the pacifier.

10. The assembly according to claim 9, wherein the hole comprises a pair of notches arranged on opposite sides of the hole to hold a ring on the pacifier.

11. The assembly according to claim 1, wherein the pair of spectacles does not include arms.

12. The aassembly according to claim 1, wherein the pair of spectacles comprises arms.

13. An assembly forming a pair of spectacles especially for an infant or very young child, comprising:
   a unitary molded connection piece shaped to fit the curvature of the infant or the very young child's face;
   wherein the unitary connection piece extends from the top of the eyes to below the mouth of the infant of the very young child;
   wherein the connection piece comprises a pair of spectacles located near the eyes of the infant or the very young child;
   wherein the connection piece, comprises a hole located near the mouth of the infant or the very young child, wherein the hole is adapted to receive the pacifier;
   wherein the connection piece comprises two connection arms extending from the lower zone of each spectacle creating an empty zone between them;
   wherein the empty zone allows the passage of the infant or the very young child's nose;
   wherein the shape of the connection piece allows that when the pacifier is placed in the mouth of the infant or the young child, the pair of spectacles is situated in line with the eyes of the infant or the young child.

* * * * *